2,811,527

DERIVATIVES OF THIENO (3,2-B) PYRIDINE AND METHOD OF PREPARING SAME

John T. Sheehan, East Bound Brook, N. J., assignor to Olin Mathieson Chemical Corporation, New York, N. Y., a corporation of Virginia No Drawing. Application November 16, 1955, Serial No. 547,291

11 Claims. (Cl. 260—294.8)

This application is a continuation-in-part of my application Serial No. 245,981, filed Sept. 16, 1951, now abandoned.

This invention relates to, and has for its object, the provision of: (A) bases of the general formula

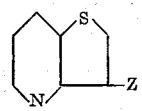

wherein Z is a member of the class consisting of amino, dialkylamino (1-piperidyl)alkylamino (1-pyrrolidyl) alkylamino, (4-morpholinyl)alkylamino, alkylamino, hydroxyalkylamino, [3-thieno (3,2-b)pyridyl]imino, and N-(dialkylaminoalkyl)-N-alkyl-amino, the alkyl in each case being lower alkyl; (B) acid-addition salts thereof; (C) quaternary ammonium salts of the class consisting of alkyl halide, dialkyl sulfate, and aralkyl halide thereof; and (D) methods of preparing A, B and C.

Since generally the thiophene nucleus is a less potent toxophore than the benzene nucleus, and since quinoline compounds are of established pharmaceutical importance, the quinoline isosters of this invention are promising therapeutic agents or intermediates for the preparation of such agents; the compound 3-aminothieno(3,2-b)pyridine, for example, being a promising antibacterial agent, its minimal inhibiting concentration (micrograms/ml) against Bacillus of Calmette and Guerin, for example, being 1.5.

The compounds of this invention are additionally useful as metal (especially copper) sequestering or chelating agents, and may be employed in place of the chelating agents commonly employed for removal of copper cation in various industrial applications. The following compounds of the invention are preferred for such purpose, being efficient for forming insoluble precipitates or otherwise removing copper cation, the amount of compound used being of course that required to bring the copper cation content down to the desired level (which amount is determinable by simple test on a sample):

3(2-diethylaminoethylamino)-thieno(3,2-b) pyridine, citrate

3(3-diethylaminopropylamino)thieno(3,2-b) pyridine citrate

3(3-dimethylaminopropylamino)thieno(3,2-b) pyridine citrate

By way of example, one of these compounds may be employed in place of a chelating agent of the ethylenediamine tetracetic acid type to overcome difficulties (such as shade change) occurring in chrome dyeing of fabrics caused by copper cation in tap water, and to control reactions of the copper-catalyzed type (for example, to stop the reaction at a particular point by removing the copper catalyst. Thus, 1.8 mg. of one of these compounds in 1 ml. distilled water will result in a copper-containing precipitate (which being brownish, is not copper citrate), when added to 1 ml. water containing .068 mg. copper chloride.

Certain of the bases (A) of this invention may be prepared by the method comprising interacting 3-hydroxy-thieno (3,2-b) pyridine with ammonia at elevated temperature, and recovering the reaction product; and the substituted amino compounds of this invention may be obtained by interacting 3-hydroxy-thieno (3,2-b) pyridine with the appropriate amine at elevated temperature, in the presence of a condensing agent such as potassium iodide.

The bases obtained may be converted into addition salts in the conventional manner, i. e., by reacting the base with the desired acid in a suitable solvent. The utilizable acids comprise: hydrochloric, hydrobromic, boric, nitric, lactic, tartaric, succinic, phosphoric, sulfuric, maleic, fumaric, inter alia, and, especially, citric acid. One or more of the basic groups may be thus salified, by using the appropriate quantity of acid. Where the salt is to be employed as a pharmaceutical, the acid selected should of course be a non-toxic one.

By treating the bases with an alkyl halide, a dialkyl sulfate, or an aralkyl halide, the alkyl being preferably lower alkyl, and the halo being preferably chloro, bromo or iodo, there is obtained in the usual manner the quaternary ammonium compounds of the bases (A) of this invention.

The following examples are illustrative of the invention:

EXAMPLE 1

*Preparation of 3-aminothieno(3,2-b)pyridine*

(a) A mixture of 2 g. 3-(carboxymethylmercapto) picolinic acid and 10 ml. acetic anhydride is refluxed for three hours, allowed to cool overnight, and then diluted with 25 ml. of water and filtered. After the filtrate has been adjusted to pH 6.0, and the supernate decanted from the tarry residue, the latter residue is washed again with water. The combined supernate and washings, on standing in the cold, yield a crystalline solid, 3-hydroxythieno (3,2-b)pyridine, melting at about 140–142° C. When crystallized from alcohol, the product melts at about 142–144° C.

(b) A mixture of 2 g. 3-hydroxythieno (3,2-b) pyridine (prepared as described in section a), 5 g. of ammonium chloride, and 15 ml. 28% ammonia solution is heated in a sealed tube at 150° C. for 22 hours. The tube is then opened, the contents washed out with 100 ml. of water, and the residue suspended in ether. After the insoluble material has been filtered off, the ether extract is extracted with an excess of 10% dilute hydrochloric acid. The acid extract is then made alkaline, and extracted once again with ether. Evaporation of the ether extract and crystallization of the residue from hexane yields 3-aminothieno (3,2-b)pyridine melting at about 88° C.

EXAMPLE 2

*Preparation of 3,3'-imino-bis[thieno(3,2-b)pyridine] and the hydrochloride thereof*

A mixture of 3 g. 3-hydroxythieno (3,2-b)pyridine and 39 ml. of saturated alcoholic ammonia is heated for 10 hours at 190 C. After cooling, the insoluble material is filtered off, and the filtrate is concentrated under vacuum; and the residue, weighing about 1.5 g., is crystallized from ethanol and recrystallized from benzene. The product (the base) melts at about 188–190° C.

The hydrochloride of the base is prepared by shaking it in 20% hydrochloric acid.

EXAMPLE 3

*Preparation of 3-(2-diethylaminoethylamino)thieno(3,2-b)pyridine and the citrate thereof*

A mixture of 10 g. 3-hydroxythieno(3,2-b)pyridine, a trace of potassium iodide and 25 ml. N,N-diethyl-ethylenediamine is heated in a sealed tube at 180° C. for 70 hours. The contents are then removed, the insoluble material filtered off, and the excess solvent evaporated. The residue is taken up in benzene, extracted with dilute acetic acid, and the combined acetic acid extract is washed with ether, made alkaline and extracted again with ether. The combined ether extract, on evaporation of the solvent, yields the base as an oil which boils at about 166–169° C./1.8 mm.

The citrate of the base may be obtained by adding to an ether solution of the base one equivalent of citric acid dissolved in ethanol. The insoluble citrate precipitates immediately, and when crystallized from alcohol melts at about 153° C. (with decomposition).

EXAMPLE 4

*Preparation of 3-(3-diethylaminopropylamino)thieno(3,2-b)pyridine and the citrate thereof*

Using N,N-diethyl-propylenediamine in place of N,N-diethyl-ethylenediamine in Example 3, an oily product is obtained, boiling at about 171–174° C./2 mm. The citrate of this base, obtained as described in Example 3, melts at about 110° C. (with decomposition).

EXAMPLE 5

*Preparation of 3-(4-diethylamino-1-methyl-butylamino)thieno (3,2-b)pyridine*

Using 4-diethylamino-1-methyl-butylamine in place of N,N-diethyl-ethylenediamine in Example 3, an oily product is obtained, boiling at about 160–167° C./1.8 mm. The citrate of this base, obtained as described in Example 3 and crystallized from acetone, melts at about 78° C. (with decomposition).

EXAMPLE 6

*Preparation of 3-(3-dimethylamino-propylamino)thieno (3,2-b)pyridine*

Using 3-dimethylamino-propylamine in place of N,N-diethyl-ethylenediamine in Example 3, there is obtained the product 3-(3-dimethylamino-propylamino)thieno(3,2-b)pyridine, as an oily liquid boiling at 180–182° C./1.8 mm. The citrate of this base, obtained as described in Example 3 and crystallized from ethanol, melts at 123–126° C. (dec.).

EXAMPLE 7

A mixture of 3 ml. of 3-(2-diethylaminoethylamino)thieno-(3,2-b)pyridine, prepared in Example 3, 4 ml. methyl iodide and 20 ml. benzyl alcohol is placed in a sealed tube and kept for 24 hours at room temperature and 24 hours at 60–65° C. The crystalline methiodide of 3 - (2-diethylaminoethylamino) thieno (3,2-b) pyridine which forms is collected (on a filter), washed with 50 ml. ether and dried.

EXAMPLE 8

Using N,N-dimethyl-ethylenediamine in place of N,N-diethylethylenediamine in Example 3, the product, 3-(2-dimethylaminoethylamino)thieno(3,2-b)pyridine is obtained.

EXAMPLE 9

Treatment of a solution of 3-(3-diethylaminopropyl-amino)-thieno(3,2-b)pyridine in hydrochloric acid with monoiodochloride yields an iodinated 3-(3-diethylaminopropylamino)thieno(3,2-b)-pyridine.

Using molar equivalents of the following reactants in place of N,N-diethyl-ethylenediamine in Example 3, the indicated corresponding compound is obtained:

| Reactant | Compound |
|---|---|
| 2-(1-piperidyl) ethylamine | 3-[2-(1-piperidyl) ethylamino]-thieno (3, 2-b) pyridine. |
| 2-(1-pyrrolidyl) ethylamine | 3-[2-(1-pyrrolidyl) ethylamino]-thieno (3, 2-b) pyridine. |
| 2-(4-morpholinyl) ethylamine | 3-[2-(4-morpholinyl) ethylamino]-thieno (3, 2-b) pyridine. |
| dimethylamine | 3-dimethylaminothieno (3, 2-b)-pyridine. |
| 3-diethylamino-2, 2-dimethylpropylamine. | 3-[3-diethylamino-2, 2-dimethylpropylamino] thieno (3, 2-b) pyridine. |
| N, N-diethyl-N'-ethyl-ethylenediamine. | 3-[2-diethylaminoethyl-ethylamino] thieno (3, 2-b) pyridine. |
| 1-amino-5-diethylaminopentane | 3-[5-diethylaminopentylamino]-thieno (3, 2-b) pyridine. |
| N, N-dibutyl-ethylenediamine | 3-[2-dibutylaminoethylamino]-thieno (3, 2-b) pyridine. |
| N-(2-hydroxyethyl)-ethylene-diamine. | 3{2-[(2-hydroxyethyl) amino] ethylamino} thieno (3,2-b) pyridine. |
| 1-amino-2-hydroxypropane | 3-(2-hydroxypropylamino) thieno-(3, 2-b) pyridine. |

Using a molar equivalent of 3-(carboxymethylmercapto)-picolinic acid having a nuclear alkyl or nitro substituent in place of 3-(carboxymethylmercapto)picolinic acid in Example 1a the corresponding alkyl- or nitro-substituted 3-hydroxythieno (3,2-b)-pyridine is obtained; and from the latter, the corresponding compounds of this invention are obtained.

The invention may be variously otherwise embodied within the scope of the appended claims.

I claim:

1. A compound of the class consisting of: bases of the general formula

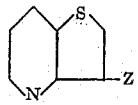

wherein Z is a member of the class consisting of amino, dialkylaminoalkylamino, (1-piperidyl)alkylamino, (1-pyrrolidyl)alkylamino, (4-morpholinyl)alkylamino, alkylamino, hydroxyalkylamino, [3-thieno(3,2-b)-pyridyl]-imino, and N-(dialkylaminoalkyl)-N-alkylamino, the alkyl in each case being lower alkyl; acid-addition salts thereof; and quaternary ammonium salts of the class consisting of lower alkyl halide, di-lower alkyl sulfate, and aralkyl halide thereof.

2. A base of the general formula

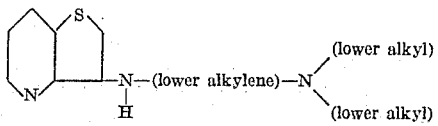

3. An acid-addition salt of a base of the general formula

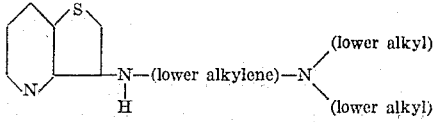

4. A lower alkyl halide quaternary ammonium salt of a base of the general formula

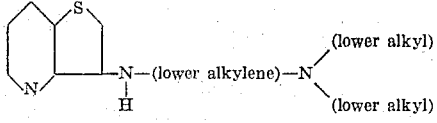

5. 3-aminothieno(3,2-b)pyridine.

6. An acid-addition salt of 3-(4-diethylamino-1-methyl-butylamino)thieno(3,2-b)-pyridine.

7. An acid-addition salt of 3-(3-dimethylaminopropyl-amino)thieno(3,2-b)pyridine.

8. The method which comprises interacting 3-hydroxythieno(3,2-b)pyridine with ammonia at elevated temperature, and recovering the reaction product.
9. An acid-addition salt of a base of the general formula
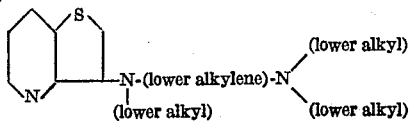
10. 3 - (2 - diethylaminoethylamino)thieno(3,2-b)pyridine.
11. 3 - (2 - diethylaminoethylamino)thieno(3,2-b)pyridine methiodide.
No references cited.